(12) United States Patent
Schoen

(10) Patent No.: US 7,865,421 B2
(45) Date of Patent: Jan. 4, 2011

(54) AUTOMATED TRADING SYSTEM

(75) Inventor: John Edward Schoen, New York, NY (US)

(73) Assignee: EBS Group Limited, London (GB)

( * ) Notice: Subject to any disclaimer, the term of this patent is extended or adjusted under 35 U.S.C. 154(b) by 469 days.

(21) Appl. No.: 11/202,856

(22) Filed: Aug. 12, 2005

(65) Prior Publication Data
US 2006/0100954 A1 May 11, 2006

Related U.S. Application Data

(60) Provisional application No. 60/601,558, filed on Aug. 13, 2004.

(51) Int. Cl.
*G06Q 40/00* (2006.01)
(52) U.S. Cl. .................. 705/37; 705/35; 705/38
(58) Field of Classification Search .......... None
See application file for complete search history.

(56) References Cited

U.S. PATENT DOCUMENTS

| | | | |
|---|---|---|---|
| 5,136,501 A | 8/1992 | Silverman et al. | |
| 5,267,148 A | 11/1993 | Kosaka et al. | |
| 5,375,055 A * | 12/1994 | Togher et al. | 705/38 |
| 5,802,499 A | 9/1998 | Sampson et al. | |
| 5,802,518 A | 9/1998 | Karaev et al. | |
| 5,924,083 A | 7/1999 | Silverman et al. | |
| 6,278,982 B1 | 8/2001 | Korhammer et al. | |
| 6,377,940 B2 | 4/2002 | Tilfors et al. | |
| 6,418,419 B1 | 7/2002 | Nieboer et al. | |
| 6,421,653 B1 | 7/2002 | May | |
| 6,519,574 B1 | 2/2003 | Wilton et al. | |
| 6,594,643 B1 | 7/2003 | Freeny, Jr. | |
| 6,772,132 B1 | 8/2004 | Kemp, II et al. | |

(Continued)

FOREIGN PATENT DOCUMENTS

CA 928429 6/1973

(Continued)

OTHER PUBLICATIONS

Shigehito Inukai, Asian Bond Markets Research Mission—Research Report—,Feb. 2003, pp. 1-2 and 36-39.*

(Continued)

*Primary Examiner*—Alexander Kalinowski
*Assistant Examiner*—Gregory Johnson
(74) *Attorney, Agent, or Firm*—Dickstein, Shapiro, LLP.

(57) ABSTRACT

An anonymous trading system is configured to receive a price stream from a bank or other institution. The price stream is converted into a quote stream and input into the trading system via an automated trading interface. The quote stream has its own deal code. The deal code credit limits are set so that the only parties that have credit with the deal code are other deal codes of the same institution. At least one of these deal codes represents a prime broker bank and prime broker customers therefore have access to the institution's price stream to the exclusion of other parties trading on the system. A distributor distributes the quotes from the trading system to the prime broker customers' traders, to prime broker customer automated trading interfaces, and to prime broker customer deal feed systems for logging of deal tickets and communication of those deal tickets to back office systems.

12 Claims, 2 Drawing Sheets

U.S. PATENT DOCUMENTS

| | | | |
|---|---|---|---|
| 7,130,823 B1 * | 10/2006 | Rayner et al. | 705/37 |
| 7,177,833 B1 * | 2/2007 | Marynowski et al. | 705/38 |
| 7,249,091 B2 * | 7/2007 | Kinney et al. | 705/38 |
| 7,542,939 B2 * | 6/2009 | Ferguson et al. | 705/37 |
| 2001/0034688 A1 | 10/2001 | Annunziata | |
| 2002/0010663 A1 | 1/2002 | Muller | |
| 2002/0010672 A1 | 1/2002 | Waelbroeck et al. | |
| 2002/0016762 A1 * | 2/2002 | Feilbogen et al. | 705/39 |
| 2002/0023045 A1 | 2/2002 | Feilbogen et al. | |
| 2002/0042765 A1 | 4/2002 | Dawson | |
| 2002/0049666 A1 | 4/2002 | Reuter et al. | |
| 2002/0049713 A1 | 4/2002 | Khemlani et al. | |
| 2002/0059129 A1 | 5/2002 | Kemp, II et al. | |
| 2002/0091615 A1 | 7/2002 | Salvani | |
| 2002/0091624 A1 | 7/2002 | Glodjo et al. | |
| 2002/0099644 A1 | 7/2002 | Kemp, II et al. | |
| 2002/0120555 A1 | 8/2002 | Lerner | |
| 2002/0128945 A1 | 9/2002 | Moss et al. | |
| 2002/0161692 A1 | 10/2002 | Loh et al. | |
| 2002/0188546 A1 | 12/2002 | Tang | |
| 2003/0009419 A1 | 1/2003 | Chavez et al. | |
| 2003/0023542 A1 | 1/2003 | Kemp, II et al. | |
| 2003/0033212 A1 * | 2/2003 | Sandhu et al. | 705/26 |
| 2003/0097327 A1 | 5/2003 | Anaya et al. | |
| 2003/0110106 A1 | 6/2003 | Deshpande et al. | |
| 2003/0126056 A1 | 7/2003 | Hausman et al. | |
| 2003/0233309 A1 | 12/2003 | Matus et al. | |
| 2003/0233313 A1 | 12/2003 | Bartolucci | |
| 2004/0039689 A1 * | 2/2004 | Penney et al. | 705/38 |
| 2004/0111356 A1 | 6/2004 | Srivastava et al. | |
| 2004/0143538 A1 | 7/2004 | Korhammer et al. | |
| 2005/0015621 A1 * | 1/2005 | Ashley et al. | 713/201 |
| 2005/0137962 A1 * | 6/2005 | Penney et al. | 705/37 |
| 2005/0149428 A1 * | 7/2005 | Gooch et al. | 705/37 |
| 2006/0015439 A1 * | 1/2006 | Brann et al. | 705/37 |

FOREIGN PATENT DOCUMENTS

| | | |
|---|---|---|
| EP | 0 512 702 A2 | 4/1992 |
| EP | 1 006 472 A2 | 6/2000 |
| GB | 2390451 | 1/2004 |
| JP | 2003-536169 A | 12/2003 |
| WO | WO 00/54191 A1 | 9/2000 |
| WO | WO 00/63814 A1 | 10/2000 |
| WO | WO 01/08065 A1 | 2/2001 |
| WO | WO 00/54037 A1 | 7/2001 |
| WO | WO 01/52150 A1 | 7/2001 |
| WO | WO 01/65403 A2 | 9/2001 |
| WO | WO 01/75751 A2 | 10/2001 |
| WO | WO 01/75752 A2 | 10/2001 |
| WO | WO 01/75753 A2 | 10/2001 |
| WO | WO 01/98960 | 12/2001 |
| WO | WO-01/98961 | 12/2001 |
| WO | WO-01/98965 | 12/2001 |
| WO | WO-01/98967 A2 | 12/2001 |
| WO | WO 02/052369 A2 | 7/2002 |
| WO | WO 2004/012032 | 2/2004 |
| WO | WO-2004/040422 | 5/2004 |
| WO | WO 2004/068272 A2 | 8/2004 |

OTHER PUBLICATIONS

Shigehito Inukai, Asian Bond Markets Research Mission—Research Report—,Feb. 2003, pp. 1-2 and 36-39.*

Shigehito Inukai, Asian Bond Markets Research Mission—Research Report—,Feb. 2003, pp. 1-2 and 36-39.*

Asian Bond Markets Research Mission—Research Report-; Shigehito Inukai; Feb. 2003; 55-pages.*

QuoteMedia Reaches Corporate Markets with Distribution Deal; Business Wire; Dec. 3, 2002; 2-pages.*

StreamingQuotes.tv Offers Low Cost Real-Time Stock Quotes on the Internet; Business Wire; Jan. 7, 2002; 2-pages.*

Trading systems; Wall Street & Technology, 22 , 1 , S73(5); Jan. 2004; 14-pages.*

* cited by examiner

AUTOMATED TRADING SYSTEM

CROSS-REFERENCE TO RELATED APPLICATION

This Application claims benefit under 35 U.S.C. 119(e) to U.S. Provisional Patent Application No. 60/601,558, filed Aug. 13, 2004, the entirety of which is incorporated by reference herein.

FIELD OF THE INVENTION

This invention relates to automated trading systems for trading products such as, but not limited to, commodities or financial instruments. It is particularly concerned with automated trading systems that integrate two or more sources of liquidity to improve the quality of quotes that are presented to a user.

BACKGROUND TO THE INVENTION

Automated trading systems have been used for many years to trade a wide range of products including to financial products including commodities such as precious metals and various financial instruments including equities and foreign exchange (FX) products such as FX spot. Within the FX spot market, there are two major types of system: direct dealing systems where deals are concluded by exchange of conversation electronically between traders; and anonymous systems in which traders submit quotes into a system anonymously and quotes are matched, subject to parameters such as credit limits. The identity of parties to a deal are only given up to the traders when the deal is completed.

Anonymous systems are one example of matching systems in which quotes submitted by parties are matched to make a deal. Typically, visible bids and offers are entered into the system which are matched by invisible hits or takes from traders. The success of any such system is dependent on the liquidity of the fungible that is being traded. Liquidity is directly dependent on the number of quotes in the system. Liquidity is crucial to the success of a trading system as it affects the ability of parties to trade and the price at which they can trade. In the FX spot market, the majority of liquidity in various currency pairs is concentrated in a single system. The effect is one of positive feedback; once a degree of liquidity is established traders know that they can execute deals at the best prices on that system and therefore place orders on that system so further increasing the liquidity in the system.

In the interbank FX spot market the majority of anonymous deals are done either on the Reuters Dealing 3000 Spot Matching system provided by Reuters plc of London UK or on the EBS Spot Matching system provided by EBS Group Limited of London UK. The market in particular currency pairs is concentrated on one or other of these systems depending upon which has the majority of the liquidity in the currency pair.

An enhancement to the EBS system, available to the market as EBS Prime, is described in WO 2004/40422, which is a counterpart of U.S. application Ser. No. 10/694,758, the contents of each of which are incorporated herein by reference in their entirety. This document discloses the use of prime brokers to give access to smaller financial institutions who would not otherwise be able to trade on the EBS system, or would only have access to limited prices as many parties trading on the system would not extend them credit. Smaller banks can trade via a prime broker bank and the counterparty to any prime broker trade is unaware that they have traded with anyone other than the prime broker bank. The prime broker bank and the customer bank will conclude a deal for the same amount but at a price which may favor the prime broker bank. The use of prime brokerage is advantageous to the customer bank as it gives them access to a pool of liquidity to which they would not otherwise have access; it is advantageous to the prime broker banks as it enables them to profit from third parties using their credit; and it is advantageous to the system operator and to all parties trading on the system as it increases the number of quotes in the system, and, therefore the liquidity in the instruments being traded.

Another approach that has been taken to increase liquidity is to make different liquidity pools available to customers through a single interface. This does not increase the liquidity of any particular system but gives the customer access to a number of different systems simultaneously, so increasing their chances of seeing the best available prices in the market. An example of this type of system is offered by FX Alliance LLC under the trade mark FXAII Quotes which displays to customers a blended rate taken from a number of liquidity providers. This system is a portal which aggregates prices from various institutions and presents the best prices to the user. Another example is provided by Lava Trading Inc under the trade mark Lava Colorbook® and disclosed in U.S. Pat. No. 6,278,982. Other portal type systems are provided by Currenex Inc under the Trade mark FX Trades and State Street Corporation of Boston Ma under the trade mark FX Connect®.

We have appreciated that there is a need to increase further the liquidity of automated trading systems such as anonymous matching systems. However, the approach taken by portal systems is not suitable and will not enhance the prices that are available to customers already on the anonymous matching system. The portal approach would integrate a bank's streaming prices directly into the anonymous matching system. However, the banks that would provide such price streams already trade on the matching system and the net effect would not be advantageous to the bank as there no additional benefit to the bank.

SUMMARY OF THE INVENTION

The invention aims to address this problem. The invention provides a system and method in which quotes derived from an institution's streaming prices are fed into the trading system. This may be via an automated trading interface. The streaming quotes are assigned a deal code. Credit limits for that deal code are set to zero for all counterparties trading on the system to whom the institution does not want to make its streaming prices available. This may exclude all parties other than other deal codes of the streaming prices institution. The institution providing the streaming prices also has a deal code providing prime brokerage to customers. These customers therefore have access to the institution's streaming prices to the exclusion of other parties trading on the system.

More specifically, there is provided a system for trading products between parties, comprising: a matching system for matching quotes submitted by counterparties for execution of trades in a product between the parties, wherein parties trading on the system each have a unique deal code to identify them to other parties on the system; a quote stream provided by a party trading on the system, the quote stream being provided to the matching system and having a unique deal code on the matching system; wherein the matching system further comprises a credit system for storing credit limits for trades between each party trading the system and each possible counter party and wherein the quote stream deal code assigns credit only to selected other deal codes, whereby access to the quote stream is restricted.

Embodiments of the invention have the advantage that institutions providing prime brokerage are encouraged to make their own proprietary price streams available to the system as it increases the attractiveness of their own prime broker services. This benefits the system as a whole as it increases the overall liquidity of the system. The customers benefit as they have access to aggregated prices via a single interface rather than requiring separate interfaces for the trading system and the institution's price stream.

Preferably, a plurality of institution provide price streams into the system. Each of these providers may also be a prime broker bank and customers may be customers of more than one prime broker bank, further increasing the quality of prices available to prime broker customers.

BRIEF DESCRIPTION OF DRAWINGS

Embodiments of the invention will now be described, by way of example only, and with reference to the accompanying drawings, in which.

DESCRIPTION OF PREFERRED EMBODIMENT

Figure 1:
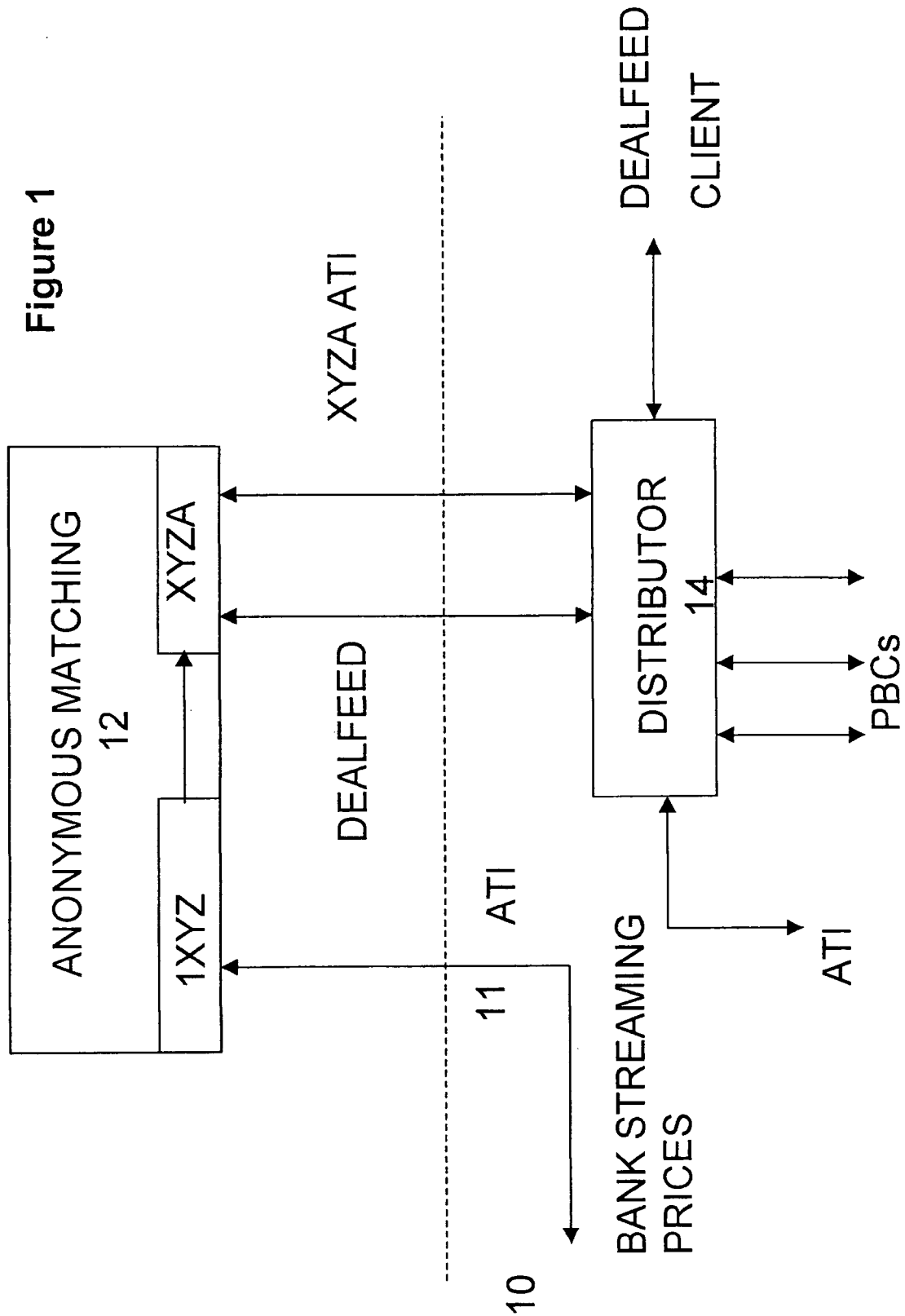
FIG. 1 is a schematic overview of a system embodying the invention.

An example of a price feed that is produced by a bank is the Autobahn price feed produced by Deutsche Bank. The Autobahn Electronic Trading system provides Deutsche Bank clients with real-time tradable prices, across numerous fixed-income sectors. This feed includes a stream of FX spot prices that are converted into quotes and then integrated into the EBS spot matching system. The manner in which a stream of prices may be converted into a stream of quotes is disclosed in our application WO2004/012032 entitled Automated Trading System, which is a counterpart of U.S. application Ser. No. 10/205,535, the contents of each of which are incorporated herein by reference in their entirety. By application of the techniques described in this application, the streaming prices received from this, or any other bank or other institution, may be converted into a stream of quotes.

Referring now to the figure, the converted streaming quotes 10 from the institution are fed directly into the EBS system 12. This is achieved by assigning a deal code to the streaming quotes. In the EBS system, each trading floor is assigned a dealing code. This code may be real or virtual in that it may refer to a physical dealing floor comprising a number of trader terminals, or a virtual trading floor, such as may be used by a prime broker bank to differentiate between prime broker trades and trades by its own traders. The deal code is a four-figure code that is used in all transactions by the trading floor in question. Thus a completed deal, and the deal ticket generated by that deal, identifies the counterparty as a particular deal code.

An anonymous trading system such as the EBS system requires participants to assign credit to potential counterparties with which it may trade on the system. The use of credit limits enable a party trading on the system to control with whom it trades even though it does not know the identity of the party submitting a quote into the system. If a party does not wish to trade with another party, for example because they consider them to be too great a risk, then they assign no credit to that counter party. In a preferred embodiment of the invention, all quotes that are shown to a given party are pre-screened for credit against a yes/no credit matrix so that the only quotes that the party sees, and therefore the only quotes that the traders can attempt to hit or take, have been submitted by counterparties with whom the party has extended credit and to whom credit has been extended by the counterparty. Before the deal can actually take place a further credit check takes place to ensure that there is sufficient actual bilateral credit remaining for the proposed trade. This approach to credit screening is disclosed in U.S. Pat. No. 5,375,055 (Togher).

Credit is assigned for a given party by a trading floor administrator (TFA) who assigns credit for that deal code to each possible counterparty deal code. Thus, as the streaming quotes 10 received from the bank are assigned to a deal code, it will be necessary for credit to be assigned by a TFA for the streaming prices to all possible counterparties on the system. Credit is only assigned to trading floors that belong to the same institution. These may be trading floors in various geographical locations around the world and may include one or more prime broker deal codes. It will be appreciated that as the trading system pre-screens all quotes for credit, and does not display quotes to parties with whom there is no credit, the institution that streams its quotes into the system controls who can see those quotes by setting credit limits to zero for all parties whom it does not want to see, or deal the quotes.

In a preferred embodiment, the credit limits for the streaming price deal code are set to zero for all counterparties except deal codes that belong to the institution providing the streaming prices. Thus, these prices are only available to the bank's own trading community. As well as the bank's own traders, if this bank is also a prime broker bank which makes its credit available to prime broker customers, so the streaming quotes will also be available to the prime broker customers as the prime broker customer logs onto the system as the prime broker bank as disclosed in WO 2004/40422 referred to above. The result of this approach is that the institution's own customers, trading on the system through the institution as a prime broker, see all the quotes that they would normally see if they were trading directly on the anonymous matching system with the prime broker's credit relationships, and additionally see the prime broker institution's own quote stream. This is highly advantageous to the prime broker bank as it enhances the attractiveness of the prime broker bank to potential customers. Not only will those customers have access to quotes that they would not see if they traded directly on the anonymous matching system, they will also have access to quotes that other parties trading on the anonymous matching system are not able to see. Third parties trading on the system will be aware that there are sources of liquidity to which they do not have access as the EBS system always displays the best quote in the market as well as the best quote that is dealable by a particular trading floor. It is a feature of the EBS system that all traders can see the 'EBS Best' price. That price is the best price that is in the market for the instrument being traded. This is attractive to the bank providing the price stream as it encourages others to sign up as prime broker customers.

Referring back to FIG. 1 the stream of prices 10 from the institution is first converted into a stream of quotes via an automated trading interface ATI 11 before being submitted to the anonymous trading system 12 as quotes originating from the same deal code 1XYZ. The quotes are then treated in the same way as any other quotes in the system but are only shown to trading floors of institution XYZ by selection of credit limits as discussed above. This is represented in FIG. 1 by the arrow extending between deal code 1XYZ and deal code XYZA. Here deal code XYZA represents a generic deal code under which sit all institution XYZ's trading deal codes.

The use of hidden deal codes is disclosed in our co-pending provisional patent application US Number unknown entitled Trading Systems the content of which are incorporated herein by reference in its entirety.

From deal code XYZA, quotes and deal information are sent to a distributor 14 which distributes the quotes to prime broker customers PBC, to automated trading interfaces ATI and to deal feed clients which receive deal ticket information relating to deals. A deal feed connection DF 16 is provided between the anonymous trading system and the distributor 14. Deal Feed is a solution provided by EBS Group Ltd to generate and distribute deal tickets to back office systems for settlement when deals have been completed. The distributor may be a part of the existing EBS system for distributing market information to customers. Thus it may be a market distributor as disclosed, for example, in U.S. Pat. No. 5,373,055 or it may a broking node as described in WO 01/98960, which is a counterpart of U.S. application Ser. No. 09/603,523, the contents of each of which are incorporated herein by reference. Any other convenient financial data distribution system may be used.

Figure 2:
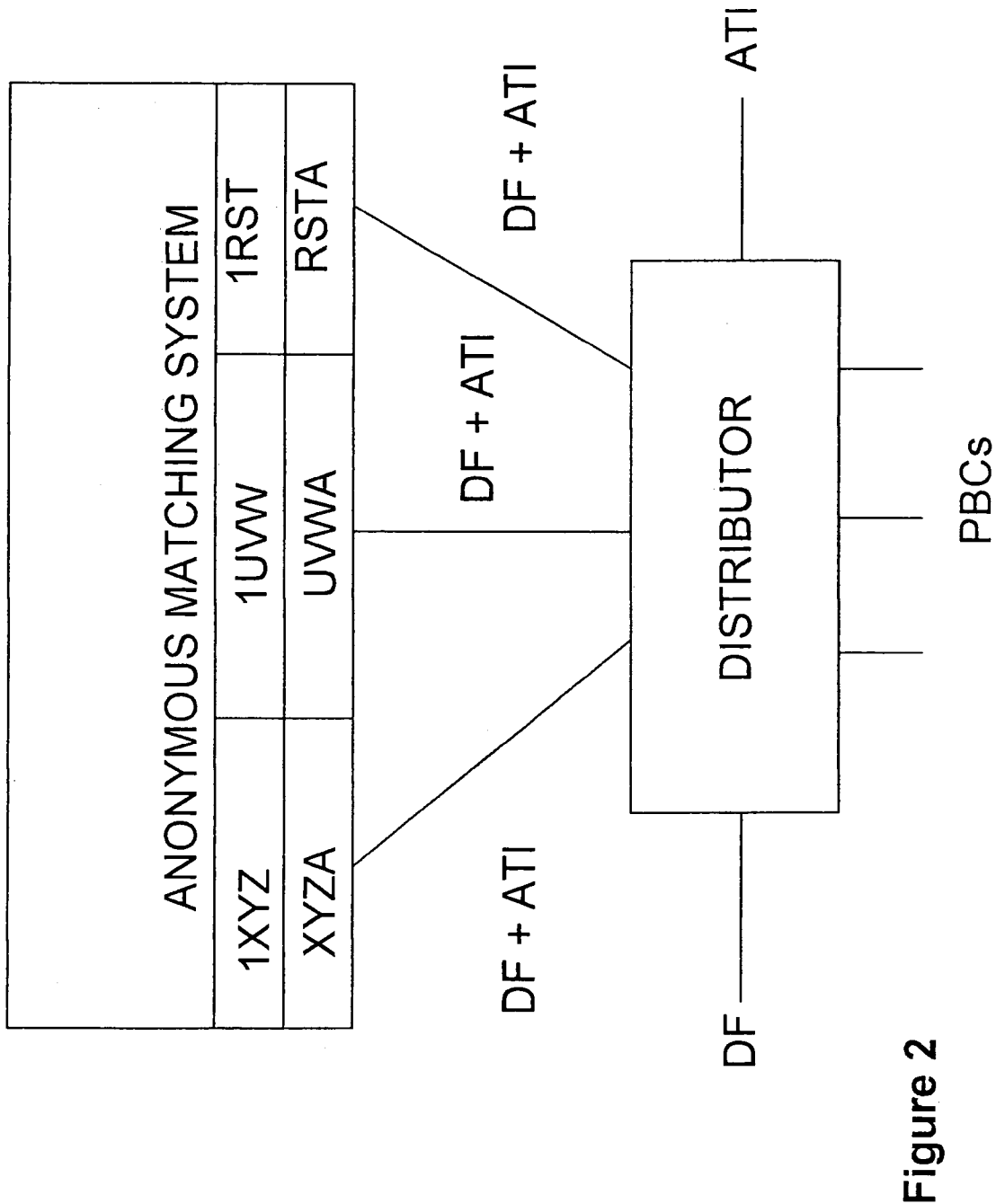
FIG. 2 is an enhancement to the system of FIG. 1.

FIG. 2 shows a further embodiment of the invention. In this embodiment there are several prime broker banks each of which supply their streaming prices into the system. Thus each of the three deal codes shown: 1XYZ, 1UVW and 1RST is a deal code that receives a stream of quotes from its own institution and which makes those quotes available on the anonymous trading system only to its own trading floors and its prime broker customers by setting credit limits to zero for all other counterparties on the system. The distributor 14 receives all the quotes for the XYZA, UVWA and RSTA families of deal codes and distributes them to their customers in the manner described with reference to FIG. 1. However, many of the customers will be prime broker customers of two or more of the banks and the distributor also functions to blend the prices so that the prime broker customers only see the best prices that are available to them.

It will be appreciated that the embodiments described enable the additional liquidity achieved by the use of prime brokers and disclosed in WO2004/40422 to be further enhanced by making banks own price streams available to their prime broker customers for trading via the anonymous trading system. From the customers' point of view this is highly desirable as they are assured of the best possible prices whilst trading on a single system, so avoiding the need to use, monitor and subscribe to several systems simultaneously. From the prime broker banks' point of view it is advantageous as it enhances the value of its prime broker service and can therefore increase revenue. From the system operator's point of view it is advantageous as it introduces increased liquidity for selected customers who are largely customers who would normally be unable to trade on the system for lack of credit. This increases the volume of quotes in the system and so increases liquidity for all users in the system and revenue to the system operator and thus increases the quality of prices available on the system.

In the system described with respect to FIGS. 1 and 2, the quotes received by the institution's customers are aggregated by the distributor so that the customer sees only the best price, whatever its source. The institution's own prices are given time priority so that if the matching system's prices are the same as the institution's own prices, the institution's prices are dealt first. In the FIG. 2 embodiment two or more institution price streams may have the best price. In this case, the customer may select a preferred prime broker bank.

In the embodiments described, it is possible that prices could become inverted leaving the institution supplying its streaming prices to the system open to an arbitrage. This may occur, for example, if the price stream received from the institution runs somewhat slower than the anonymous matching system. The matching system is configured to ensure that exposure to arbitrage is minimised. This situation arises if the institution streaming bid is less than the best dealable offer on the trading system or the institution's streaming offer is less than the trading system's best dealable bid. The arbitrage possibility is removed simply by removing the institution's bid or offer in these circumstances.

Prime broker banks may have view-only access to the prices passed to prime broker customers via the distributor. The display to prime brokers indicates the best prime broker customer bid and offer.

In a further embodiment of the invention, other pools of liquidity may be introduced into the system in the manner described above. These liquidity pools may not only be price streams from institutions that also act as prime brokers on the system but also may be price streams from other institutions or even quotes from other trading systems.

It should be appreciated that the distributor, which may function to aggregate prices as well as distributing them to prime broker customers, does not perform any matching. Matching of quotes is still performed by the anonymous trading system in the same manner as in conventional systems.

It will be apparent that the distributor is not able to enforce credit rules and merely passes deal attempt messages and rejection messages between the trading system and the prime broker customers. However, within the trading system the institutions' streaming prices are subject to the same credit rules as other parties to the system. It will be appreciated that the use of credit limits is key to being able to show prices only to the institutions' customers. Trades on streamed prices are subject to the same post matching credit checks as conventional trades on the system. In the same manner, the system does not distinguish between different quote sources when producing deal tickets after trades have been completed.

In an alternative embodiment of the invention, the price streams from the institutions are fed directly to the distributor. While this approach retains the advantages of being able to distribute streamed prices only to the institution's customers, it cannot service a global market from a single price stream. In practice it is necessary to locate a separate distributor in each major market, e.g. London, New York and Tokyo. In the embodiments of FIGS. 1 and 2 a single price feed into the trading system via an ATI to convert the prices into quotes is sufficient as the mechanism of the trading system is designed to distribute quotes to traders around the world. In the EBS system a clique of arbitrators each having associated broker nodes including market distributors is used. One version of this system is disclosed in U.S. Pat. No. 5,375,055 (Togher) the content of which is incorporated herein by reference. If the price feed is fed directly to the distributor then a separate feed is needed for each distributor which is not preferred.

The system has been described in the context of an FX Spot matching system. However the invention is not limited to such a system and may be used with any system in which credit limits or other parameters are assigned to prevent some parties to the system seeing and dealing quotes input by other parties to the system. Such a system need not be anonymous. The invention is not limited to any particular financial instruments but is applicable to any product that can be traded on an automated trading system.

The conversion of a price stream to a quote stream is not always essential. In some instances, the institution will be able to output a quote stream in which case no further conversion is required by the system.

Many alternatives and modifications to the embodiments described are possible within the scope of the invention and will occur to those skilled in the art. The scope of the invention is limited only by the following claims.

What is claimed is:

1. A system for trading products between parties, comprising one or more computers on a network, the system including:
   a matching system that matches quotes submitted by counterparties for execution of trades in a product between the parties, wherein parties trading on the system each have a unique deal code to identify them to other parties on the system;
   means for converting a stream of prices provided from outside the system into a quote stream, the quote stream being provided to the matching system and having a unique deal code on the matching system;
   wherein the matching system further comprises a credit system that stores credit limits for trades between each party trading on the system and each possible counter party, and a market distributor that distributes quotes to counterparties, the market distributor distributing to a given counterparty only quotes from other counterparties with whom the given counterparty has credit, and wherein the quote stream deal code assigns credit limits for storage in the credit system such that only selected other deal codes have access to quotes in the quote stream.

2. A system according to claim 1, wherein the quote stream deal code assigns credit only to other deal codes of the same institution.

3. A system according to claim 2 wherein the other deal codes of the same institution includes at least one deal code through which third parties can trade using the institution as a prime broker.

4. A system according to claim 3, comprising a distributor receiving quotes from the trading system specific to the other deal codes of the institution and distributing those quotes to customers of the prime broker.

5. A system according to claim 4 wherein the quotes are distributed to customer trader terminals.

6. A system according to claim 4, wherein the quotes are distributed to at least one customer automated trading interface.

7. A system according to claim 1, comprising means for converting each of a plurality of streaming prices each from a different institution into a quote stream.

8. An automated trading system for trading products between parties, comprising one or more computers on a network, the system including:
   a matching system that matches quotes submitted by counterparties for execution of trades, each counterparty having a deal code identifying the counterparty;
   a credit module that stores credit limits for trades between each deal code and each other possible deal code of the system;
   a market distributor that distributes to counterparties quotes submitted to the matching system, the market distributor distributing to a given counterparty only quotes from counterparties with whom the given counterparty has credit;
   means for converting a stream of prices from a third party into a quote stream, the quote stream being provided to the matching system and having a unique deal code;
   wherein the quote stream deal code assigns credit limits for storage in the credit module such that only selected other deal codes have access to quotes in the quote stream.

9. An automated trading system, comprising one or more computers on a network, the system including:
   a matching system that matches quotes submitted by counterparties for execution of trades;
   a credit module that stores credit limits for trades between counterparties;
   a market distributor that distributes to counterparties only quotes submitted by other counterparties with whom they have credit;
   means for converting a stream of prices from a remote source outside the system into a quote stream, the quote stream being provided to the matching system; and
   wherein the credit module includes an assignment, by the quote stream, of credit from the quote stream to selected counterparties, such that only counterparties having credit with the quote stream have access to quotes in the quote stream.

10. A system for trading products between parties, comprising one or more computers on a network, the system including:
    a matching system that matches quotes submitted by counterparties for execution of trades in a product between the parties, wherein parties trading on the system each have a unique deal code to identify them to other parties on the system;
    one or more computers configured to convert a stream of prices provided from outside the system into a quote stream, the quote stream being provided to the matching system and having a unique deal code on the matching system;
    wherein the matching system further comprises a credit system that stores credit limits for trades between each party trading on the system and each possible counter party, and a market distributor that distributes quotes to counterparties, the market distributor distributing to a given counterparty only quotes from other counterparties with whom the given counterparty has credit, and wherein the quote stream deal code assigns credit limits for storage in the credit system such that only selected other deal codes have access to quotes in the quote stream.

11. An automated trading system for trading products between parties, comprising one or more computers on a network, the system including:
    a matching system that matches quotes submitted by counterparties for execution of trades, each counterparty having a deal code identifying the counterparty;
    a credit module that stores credit limits for trades between each deal code and each other possible deal code of the system;
    a market distributor that distributes to counterparties quotes submitted to the matching system, the market distributor distributing to a given counterparty only quotes from counterparties with whom the given counterparty has credit;
    one or more computers configured to convert a stream of prices from a third party into a quote stream, the quote stream being provided to the matching system and having a unique deal code;
    wherein the quote stream deal code assigns credit limits for storage in the credit module such that only selected other deal codes have access to quotes in the quote stream.

12. An automated trading system, comprising one or more computers on a network, the system including:

a matching system that matches quotes submitted by counterparties for execution of trades;

a credit module that stores credit limits for trades between counterparties;

a market distributor that distributes to counterparties only quotes submitted by other counterparties with whom they have credit;

one or more computers configured to convert a stream of prices from a remote source outside the system into a quote stream, the quote stream being provided to the matching system; and wherein the credit module includes an assignment, by the quote stream, of credit from the quote stream to selected counterparties, such that only counterparties having credit with the quote stream have access to quotes in the quote stream.

* * * * *